March 19, 1968 H. A. HILSINGER, JR 3,373,954

RETRACTILE TELEPHONE CORD STORAGE ARRANGEMENT

Filed March 11, 1966 2 Sheets-Sheet 1

INVENTOR
H. A. HILSINGER JR.
BY E. J. Snider
ATTORNEY

March 19, 1968 H. A. HILSINGER, JR 3,373,954
RETRACTILE TELEPHONE CORD STORAGE ARRANGEMENT
Filed March 11, 1966 2 Sheets-Sheet 2

United States Patent Office 3,373,954 Patented Mar. 19, 1968

3,373,954

RETRACTILE TELEPHONE CORD STORAGE ARRANGEMENT

Harry A. Hilsinger, Jr., Hope Township, Warren County, N.J., assignor to Bell Telephone Laboratories, Incorporated, New York, N.Y., a corporation of New York Filed Mar. 11, 1966, Ser. No. 533,637
10 Claims. (Cl. 242—107)

ABSTRACT OF THE DISCLOSURE

In a retractile coiled cord arrangement for an electrical appliance for a telephone handset, a retracting wire mounted on a spring-loaded drum has its free end affixed to the cord near its operating end so that upon the release of tension on the wire, the coiled cord is automatically retracted and stored within an accommodating tube.

This invention relates to reel and storage arrangements for retractile electric extension cords and more particularly to the adaptation of such arrangements to telephone handset cords.

The desirability of retractile cords for various electrical appliances and telephone handsets has long been recognized and various approaches toward providing such cords have been taken in the prior art. One conventional approach, for example, is based on the utilization of a spring-loaded reel device that maintains tension on the cord as it is unreeled and automatically reels the cord in whenever the tension exceeds that exerted by the user. Problems inherent in spring-loaded cord reels include the necessity for a compromise between an optimum reel of simple construction and small size, which in turn implies a highly flexible cord of small dimension, and the desirability of a rugged, wear-resistant cord which necessitates a tough protective covering at the expense of an increase in cord diameter and a reduction in cord flexibility.

The common helically coiled or spiral telephone handset cord provides only a part solution to the problems involved in selecting ideal parameters for both cord and reel. The conventional use of a helically coiled handset cord substitutes the natural retractile springlike feature of a spiral cord for a retracting reel. Still not met, however, is the need for cord storage that a reel provides. Although a spiral cord occupies considerably less space, in terms of length, in its rest or nonextended state than when extended, a cord that is several feet in length typically hangs in a long awkward catenary that is less than ideal from the standpoint of both convenience and appearance.

Accordingly, one object of the invention is to enhance the appearance and convenience aspects of spiral telephone handset cords.

Another object is to meet the need for a storage facility for a spiral telephone handset cord without the utilization of a large retracting reel.

These and other objects are achieved in accordance with the principles of the invention by uniquely combining the retractile feature of a coiled or spiral cord with the retractile feature of a spring-loaded reel. The spiral cord is not stored on the reel, however, and instead, in accordance with the invention, retractile tension is exerted on the cord, in addition to its inherent retractile tension, by a relatively fine nonconducting line having one end thereof affixed to the handset cord near the handset and the other end thereof anchored to an automatically spring-loaded reel. When the combined retracting force of the reel and the inherent retracting force of the extended cord exceed the pull exerted by the user, the cord retracts and is neatly and compactly stored in a cylindrical storage tube.

Consequently, a feature of the invention is the utilization of a supplementary, reel-operated retracting cord in combination with a spiral telephone handset cord.

Another feature is an arrangement for automatically storing a spiral type telephone cord in a cylindrical storage tube upon the release of handset tension by the user.

The principles of the invention as well as additional objects and features thereof will be fully apprehended from the following detailed description of an illustrative embodiment and from the drawing in which.

Figures 1, 2:
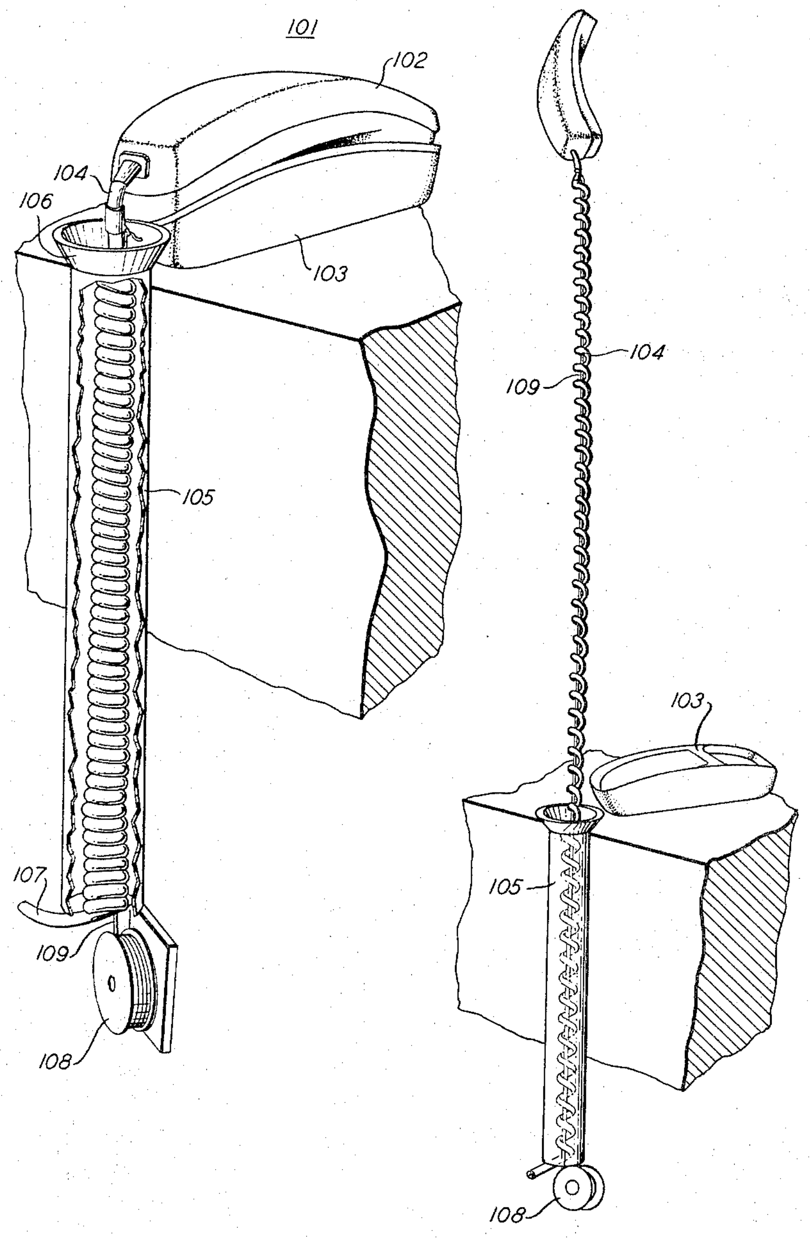
FIG. 1 is a sketch, shown in perspective, of a telephone cord retracting and storage arrangement in accordance with the invention.
FIG. 2 shows the arrangement of FIG. 1 with the cord in an extended condition.

As shown in FIG. 1, the principles of the invention may advantageously be adapted to a storage and retracting arrangement for the cord of a telephone handset. The telephone set 101 is wholly conventional and includes a handset 102 and a base member 103. A helically coiled handset cord 104 is affixed to one end of the handset 102 and the cord is shown in its fully coiled or retracted position.

Figure 3:
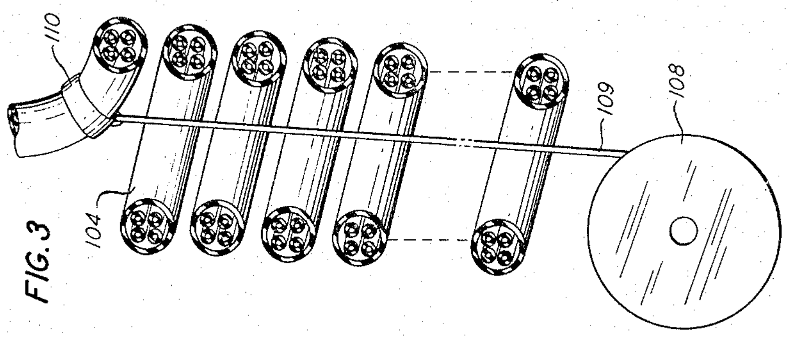
FIG. 3 is an enlarged sketch, partially in cross section of the cord shown in FIGS. 1 and 2.

A storage tube 105, which includes an open throat portion 106, serves conveniently as a storage receptacle for the cord 104 when the cord is in its fully retracted position. The bottom end of the cord 104 is suitably affixed, as by tying, to an anchoring bracket 107 which may be either integral with or affixed to the tube 105. A conventional spring-actuated reel device 108 is mounted at the bottom end of storage tube 105. An auxiliary nonconducting cord 109 extends through the center of the helical coils of cord 104, as shown in detail in FIG. 3. The auxiliary cord 109, which may advantageously be composed of nylon or other similar wear-resistant material, has one end thereof affixed to the reel 108 and the opposite end thereof affixed by a suitable securing strap 110 to the telephone handset cord 104 at a point relatively remote from reel 108 and relatively near to the telephone handset 102.

When the handset 102 is in use and the cord 104 is extended, as shown in FIG. 2, the auxiliary cord 109 is stripped from the spring-actuated reel 108 but continues to exert a restoring force on handset 102 through the cord 104. It should be noted at this point that the reel 108 is preferably one of the type well known in the art that applies a constant drag or restoring force irrespective of its particular rotational position.

With the cord 104 extended under the conditions illustrated in FIG. 2, it is evident that a dual restoring force is exerted toward returning the cord 104 to its housed condition. One part of this restoring force results from the inherent retracting force of a relatively stiff helically coiled cord and the other part results from the action of the reel 108 and the auxiliary cord 109 in the manner described. When restraining force on the handset 102 is reduced, as for example when the handset is returned to its position of rest on its base 103, the dual restoring force described operates automatically to retract the cord 104 into the storage tube 105 as the auxiliary cord 109 is rewound on reel 108.

Figure 4:
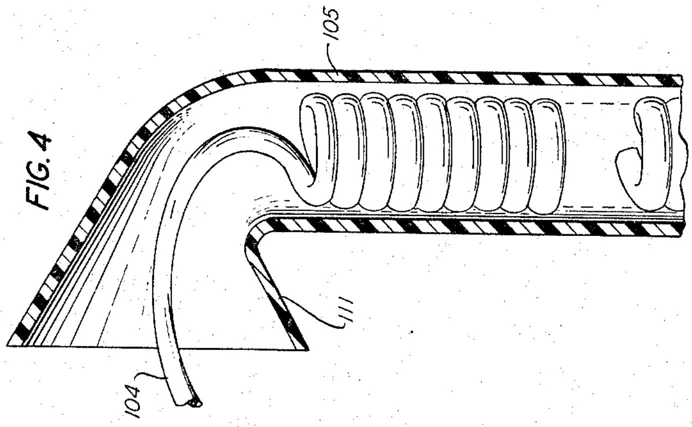
FIG. 4 is an enlarged view of the storage tube shown in FIG. 1 with the throat portion disposed at a 90 degree angle to the storage tube proper.
Figure 5:
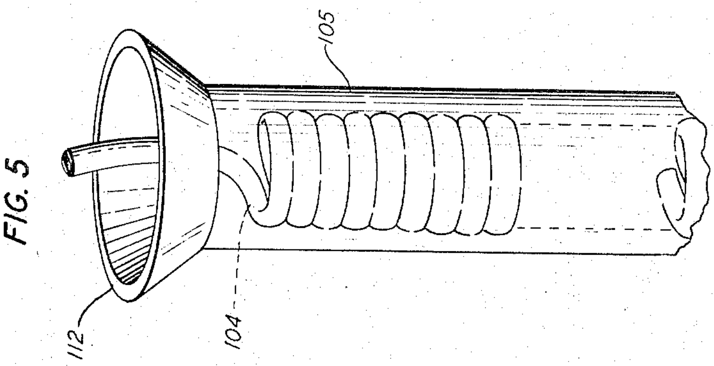
FIG. 5 is an enlarged sketch of the storage tube shown in FIGS. 1 and 2 with the throat thereof mounted on a universal-type joint with respect to the storage tube proper.

In FIG. 1 the telephone set 101 is shown resting on a horizontal surface such as a table top or the like and storage tube 105 is vertically disposed on the side thereof. In other arrangements or environments it may be desirable to change the physical relationship of the telephone set and storage tube and accordingly, it may be desirable, as shown in FIG. 4, to have the open portion 111 of the storage tube 105 disposed at right angles thereto. In other arrangements it may be desirable to have a fully adjustable relationship between the flared neck portion 112, as shown in FIG. 5, and the storage tube 105. This need may readily be met, in accordance with the invention, simply by mounting the throat portion 112 on a conventional universal type mounting to permit ready adjustment of the angle between the throat 112 and the tube 105.

It is to be understood that the embodiment described herein is merely illustrative of the principles of the invention. Various modifications may be made thereto by persons skilled in the art without departing from the spirit and scope of the invention.

What is claimed is:

1. Apparatus for retracting a helically coiled, electrically conducting cord comprising, in combination, a nonconducting cord threaded through the center area bounded by the coils of said conducting cord, a spring-loaded reel, one end of said nonconducting cord being affixed to said reel, the other end of said nonconducting cord being affixed to said conducting cord at a point relatively remote from said reel, means for storing said helically coiled cord when said coiled cord is in a fully coiled or retracted state, whereby, upon the release of said coiled cord from an extended state, said coiled cord is urged into said storing means under the combined force of said reel and the inherent retractile force of said coiled cord.

2. Apparatus in accordance with claim 1 wherein said storing means comprises a substantially cylindrical tube.

3. Apparatus in accordance with claim 1 wherein said storage means comprises a substantially cylindrical tube with a flared throat portion, said reel being positioned adjacent one end of said tube opposite to said throat portion.

4. Apparatus in accordance with claim 3 including means for anchoring said helically coiled cord at one end of said tube opposite from said throat portion.

5. Apparatus for retracting a helically coiled cord for a telephone handset comprising, in combination, a nonconducting cord threaded through the center area bounded by the coils of said helically coiled cord, one end of said nonconducting cord being affixed to said coiled cord at a position relatively close to said handset, means secured to the opposite end of said nonconducting cord for applying a substantially constant retracting force to said handset by way of said nonconducting cord as said coiled cord is placed in an extended condition in response to movement of said handset away from said means, whereby upon the release of cord-extending force by said handset said coiled cord is returned to a relatively compact fully coiled condition by the combination of forces exerted by said retracting means and by the inherent retractile force of said helically coiled cord.

6. Apparatus in accordance with claim 5 wherein said means comprises a spring-loaded reel.

7. Apparatus in accordance with claim 6 including a tubular member for housing said coiled cord in its fully coiled or nonextended condition, said reel being positioned adjacent to one end of said tubular member.

8. Apparatus in accordance with claim 7 wherein a portion of said helically coiled cord relatively remote from said handset is anchored to one end of said tubular member.

9. Apparatus in accordance with claim 8 wherein said tubular member includes a flared open end portion opposite to said one end.

10. Apparatus for retracting and stowing a helically coiled cord for a telephone handset comprising, in combination, an auxiliary cord threaded through the open center core bounded by the coils of said coiled cord, one end of said auxiliary cord being affixed to said coiled cord at a point substantially adjacent said handset, a tubular member for stowing said coiled cord when said coiled cord is in the fully coiled or retracted condition, one portion of said coiled cord relatively remote from said handset being affixed to one end of said tube member, and a spring-loaded reel affixed to said end of said tube member, the other end of said auxiliary cord being affixed to said reel, whereby, upon the release of holding force from said handset with said coiled cord in a substantially extended position, the combined forces of the inherent retractile force of said coiled cord and the retracting force of said reel applied to said coiled cord by way of said auxiliary cord operate to withdraw said cord in relatively tight compact helical coils into said tubular member.

References Cited

UNITED STATES PATENTS

| | | | |
|---|---|---|---|
| 2,607,863 | 8/1952 | MacFarland | 191—12 |
| 3,227,802 | 1/1966 | Pressley | 191—12 X |

FOREIGN PATENTS

| | | |
|---|---|---|
| 951,833 | 3/1964 | Great Britain. |
| 107,473 | 12/1923 | Switzerland. |

WILLIAM S. BURDEN, *Primary Examiner.*